Sept. 26, 1944.   S. T. SMITH   2,359,011
AUTOMATIC POWER RELEASE CLUTCH
Filed May 4, 1942   4 Sheets-Sheet 1

INVENTOR.
Shardon T. Smith
BY Myron J. Dikeman
ATTORNEY

Sept. 26, 1944.    S. T. SMITH    2,359,011
AUTOMATIC POWER RELEASE CLUTCH
Filed May 4, 1942    4 Sheets-Sheet 2

INVENTOR.
Skardon T. Smith
Myron J. Dikeman
ATTORNEY

Sept. 26, 1944.  S. T. SMITH  2,359,011
AUTOMATIC POWER RELEASE CLUTCH
Filed May 4, 1942   4 Sheets-Sheet 3

INVENTOR
Sheldon T. Smith
BY Myron J. Dikeman
ATTORNEY

Sept. 26, 1944.  S. T. SMITH  2,359,011
AUTOMATIC POWER RELEASE CLUTCH
Filed May 4, 1942  4 Sheets-Sheet 4

INVENTOR.
Skardon T. Smith
BY Myron J. Dikeman
ATTORNEY

Patented Sept. 26, 1944

2,359,011

UNITED STATES PATENT OFFICE 2,359,011

AUTOMATIC POWER RELEASE CLUTCH

Skardon T. Smith, Detroit, Mich.

Application May 4, 1942, Serial No. 441,674

5 Claims. (Cl. 192—36)

This invention relates to an improvement in my former locking devices described in Patent No. 1,835,349, dated Dec. 8, 1931, and Patent No. 2,028,629, dated Jan. 21, 1936, and herein adapting the locking units as applied to a power release clutch.

The object of my invention is to provide a special release clutch for power transmission line shafting, capable of automatically releasing same while in motion.

Another object is to provide a release clutch adapted for transmitting power to any driven unit section, and which may be intermittently disconnected while the clutch unit is in motion.

A further object is to provide an automatic release clutch that is simple in construction, easily and efficiently operated and that can be manufactured at a low cost.

These several objects are attained in the preferred form by the construction and arrangement of parts more fully hereinafter set forth.

Similar parts on all drawings are marked by similar numerals or letters.

Figure 1:
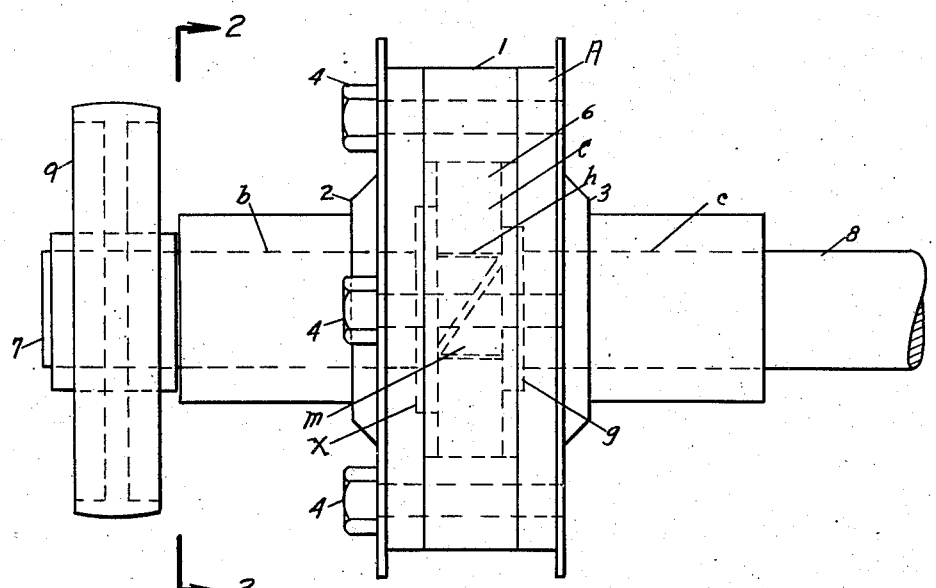
Fig. 1 is an elevation of the assembled clutch showing the exterior design.
Figure 2:
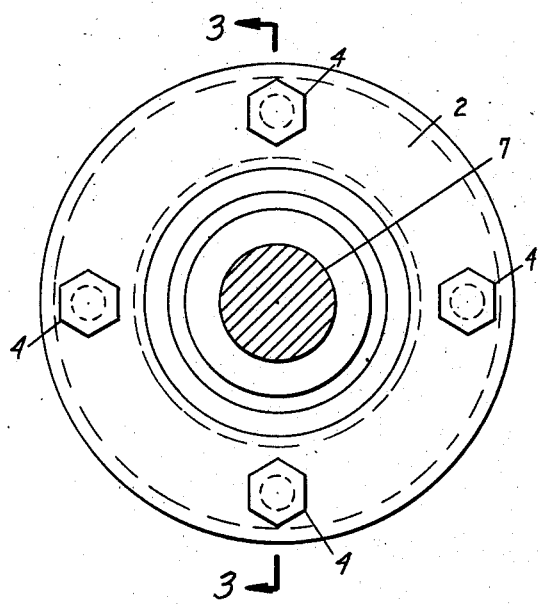
Fig. 2 is an end view taken on the line 2—2 of the Fig. 1, showing the housing chamber formation.

The general construction of my device comprises a flanged pulley clutch housing formed with a cylindrical chamber therein, concentric with the clutch pulley axis, and provided with cylindrical bearings at opposite ends thereof, each bearing carrying a shaft section rotatably mounted therein. Within the clutch housing chamber is mounted rotatably a special locking unit engageable with operating lugs formed on the abutting ends of the shaft sections. An operating brake wheel is provided on one shaft end for automatically releasing the inclosed locking unit from the clutch housing chamber walls while in motion. The adjacent shaft lug $m$ of the driven unit section is designed to displace and lock the inclosed locking unit with the pulley clutch housing for transmitting power thereto and to any connected power shafting or machine.

I will now describe more fully the detailed construction of my device, referring to the drawings and the marks thereon.

Figure 3:
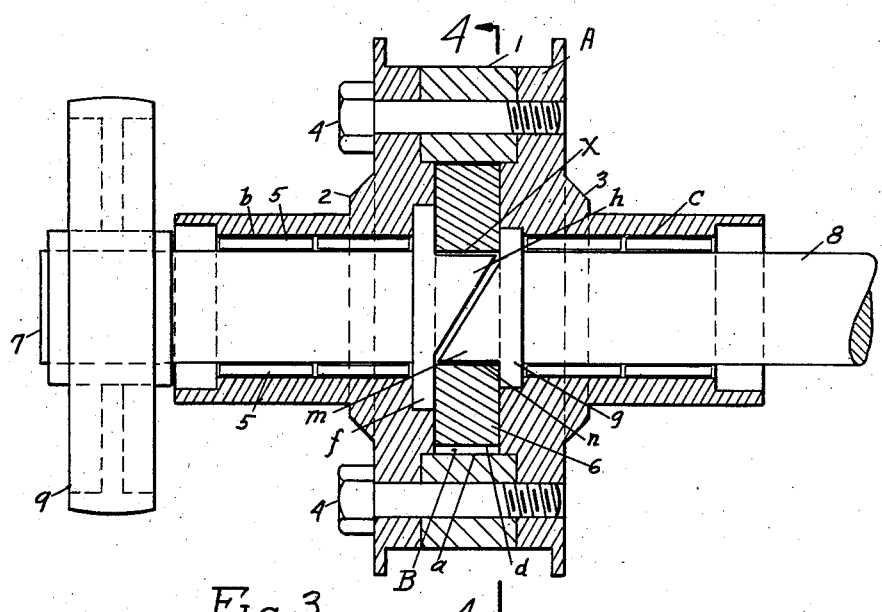
Fig. 3 is a sectional view, except for the central shaft units, taken on the line 3—3 of Fig. 2, showing the general arrangement of the operating parts as applied through a disc locking unit.
Figure 4:
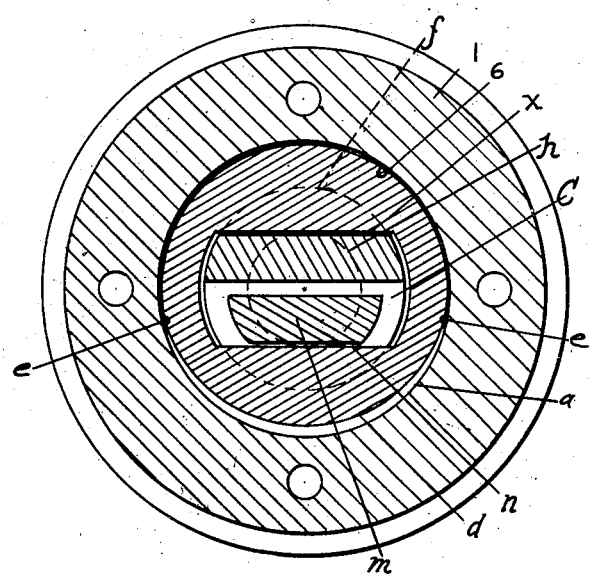
Fig. 4 is a cross-sectional view taken on the line 4—4 of the Fig. 3, showing the relative position of the operating parts.

The housing A is preferably formed of a cylindrical clutch 1 having flanged end housing caps 2 and 3 rigidly mounted on opposite ends thereof by the stud bolts 4, forming a combination pulley housing unit. The clutch 1 is formed a true cylindrical section, preferably with a hardened and ground inner cylindrical surface $a$. Both end housing caps 2 and 3 are likewise turned cylindrical sections formed with oppositely disposed shaft bearing recesses $b$ and $c$ respectively, and each preferably provided with a roller bearing 5 mounted therein. Within the housing clutch 1 is fitted a cylindrical lock disc 6 formed of a diameter slightly smaller than the inclosing clutch surface $a$, allowing a slight displacement therein. The edge $d$ of the lock disc is cut away along an arc less than a semi-circle, forming opposing contact points $e$ on opposite disc edges, designed and positioned to contact the clutch ring surface $a$ at a predetermined locking angle whenever said disc is so displaced sidewise therein transversely of the shaft axis under externally applied pressure. The disc 6 is provided with a central recess C formed with parallel sides $x$ and $n$. A short release shaft 7 is rotatably mounted through the bearing 5 of the end cap 2, and the driven shaft section 8 is likewise rotatably mounted through the opposite bearing 5 of the end cap 3 adapted for connecting to any driven shaft or machine, and as illustrated in the Fig. 3 of the drawings. Each of the shaft sections is provided with an attached collar $f$ and $g$ respectively, for retaining said shaft sections in position within the clutch chamber B. The short shaft section 7 is provided with a fixedly attached brake drum 9, of suitable design for either hand or mechanically applied frictional resistance, as the use may require. The shaft collar $f$ is provided with an elongated beveled operating lug $h$ across the inner face thereof, designed to engage the disc recess wall $x$ for retaining the lock disc 6 in a centralized position within the housing chamber, free to rotate therein, whenever a resisting force is applied to the shaft section 7 through the brake wheel 9. Likewise the driven shaft collar g is provided with a similar beveled operating lug m across the inner face thereof, designed to engage the disc recess wall n for forcibly displacing said lock disc 6 within the clutch I and locking same therewith, as the pulley housing is rotated under power applied thereto against any connected resisting load, thus rotating the connected shaft section 8 and connected load therewith. The restricted disc recess C forms a yoke about the projected operating lugs h and m, causing rotation of both shaft sections 7 and 8.

It can readily be seen that if the driven shaft 8 is connected to a useful load or machine, and rotating power be applied to the pulley housing A through a connecting belt, or otherwise, causing rotation thereof, the back pressure of the load or machine applied through the shaft operating lug m will force the lock disc 6 sidewise transversely of the shaft axis to lock with the clutch chamber walls a, and thereby transmit all power directly to the driven shaft section 8 and connected machine. However, if a resisting force be applied to the brake wheel 9, by friction or otherwise, the connected shaft operating lug h will automatically release the lock disc 6 from the clutch chamber wall a, centralizing same to a free rotating position therein, and allowing the driven shaft section to stop without discontinuing rotation of the pulley housing mounted thereon. A release of the hand friction wheel 9, will likewise again connect the shaft 8 with the pulley for continued rotations thereof, the entire change being accomplished without stopping the power housing pulley A.

Figure 5:
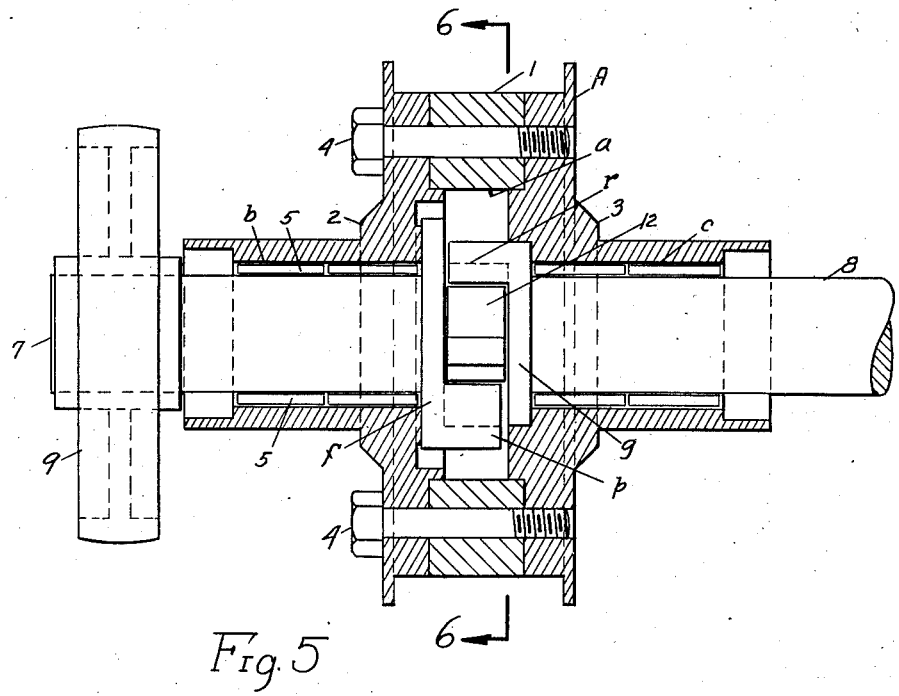
Fig. 5 is a modified sectional view, except for the central shafting units, similar to the Fig. 3, and as of line 3—3 on Fig. 2, showing the modified general arrangement of the operating parts as applied to the lock bar construction.
Figure 6:
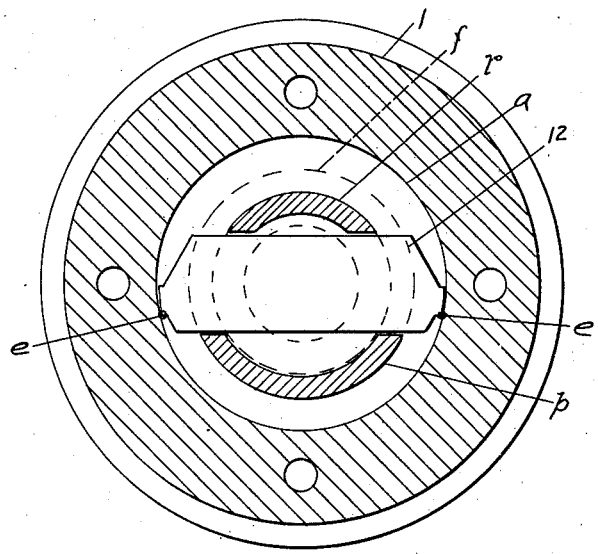
Fig. 6 is a cross-sectional view taken on the line 6—6 of the Fig. 5, showing the relative position of the lock bar and operating lugs.
Figure 7:
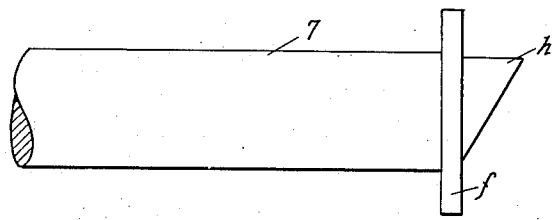
Figs. 7 to 10 show details of the operating shaft lugs as applied to the lock disc construction shown in Figs. 3 and 4.
Figure 8:
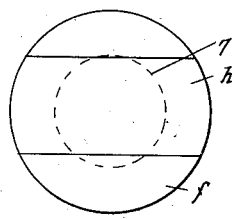
Figure 10:
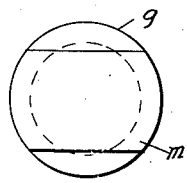
Figure 9:
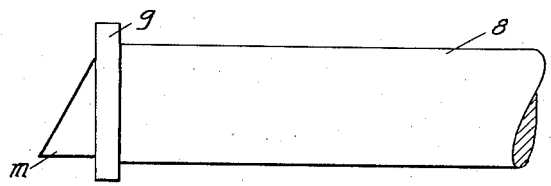
Figure 11:
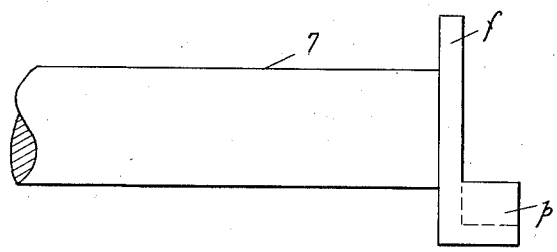
Figs. 11 to 14 show details of the operating lugs as applied to the lock bar construction shown in Fig. 5.
Figure 12:
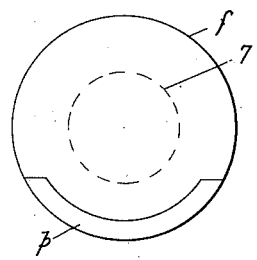
Figure 14:
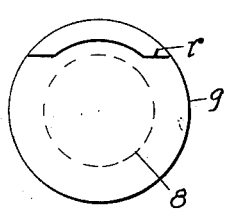
Figure 13:
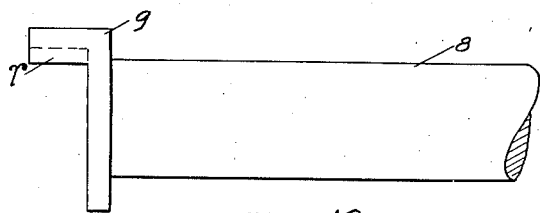

A further application of my device is illustrated in a slightly modified form in Figs. 5 and 6 of the drawings, applying the same device to the lock bar unit instead of a lock disc previously described. The modified shaft lugs p and r correspond to the previously described lugs m and h respectively, and lock and displace the lock bar 12, which is actually a section of the previously described disc 6, in the same manner as in the former case. The application and operation is the same as heretofore described.

Having fully described my automatic power release clutch, what I claim as my invention and desire to secure by Letters Patent is:

1. A power release clutch adapted for releasing connected shaft sections while in motion, comprising a power driven clutch housing formed with a central cylindrical chamber provided with connected shaft bearings through opposite ends thereof positioned concentric with the chamber axis, a release shaft formed with a friction drum on the outer end, rotatably mounted within one end housing bearing and a driven shaft section rotatably mounted in the opposite end housing bearing, each of said shaft sections being formed with a projected operating lug on the inner abutting ends thereof, positioned within the housing chamber and overlapping each other, a friction locking unit rotatably mounted within the housing chamber and capable of sidewise displacement transversely of the shaft axis locking with the chamber walls when forced thereagainst, said locking unit being designed to engage the adjoining shaft lugs capable of forcible sidewise displacement thereby transversely of the shaft axis for engaging or disengaging the locking unit with the clutch chamber walls as a resisting force is applied to the respective shaft sections.

2. A power release clutch adapted for releasing connected shaft sections from the power clutch housing while in motion, comprising a power driven clutch formed with a central cylindrical chamber provided with connected shaft bearings through opposite ends thereof positioned concentric with the chamber axis, a release shaft formed with a friction drum on the outer end thereof rotatably mounted in one end housing bearing and a driven shaft section rotatably mounted in the opposite end housing bearing, each of said shaft ends being provided with a flattened wedge shaped operating lug on the inner abutting end thereof, positioned with their respective beveled faces adjoining and overlapping each other within the housing chamber, a lock disc formed with parallel wall central recess rotatably mounted within the housing chamber positioned with the central recess inclosing the overlapping said shaft operating lugs and engageable therewith along the lug flattened surfaces capable of forcible sidewise displacement thereby transversely of the shaft axis for engaging or disengaging the housing chamber walls as a resisting force is applied to the respective shaft sections.

3. A power release clutch adapted for releasing a connected driven shaft section from the power unit while in motion, comprising a power driven clutch housing formed with a central cylindrical chamber provided with connected shaft bearings through opposite ends thereof positioned concentric with the chamber axis, a release shaft section provided with a friction drum on the outer end thereof rotatably mounted within one end housing bearing, a driven shaft section rotatably mounted within the opposite end housing bearing, each of said shaft sections being provided with an extended overlapping operating lug projection on the inner abutting ends thereof, positioned within the clutch chamber, a friction locking unit capable of sidewise displacement transversely of the shaft axis rotatably mounted within the clutch chamber, capable of locking therewith at some predetermined locking angle when forcibly displaced thereagainst, said locking unit being designed to engage both shaft lug projections operatively and in a manner for locking with the clutch chamber walls whenever a restraining pressure is applied to the driven shaft unit, likewise be displaced and released from the clutch chamber walls when a restraining force is applied to the friction drum mounted on the extended release shaft section.

4. A power release clutch adapted for releasing connected shaft sections from a power clutch housing while in motion, comprising a power driven cylindrical clutch casing formed with a central cylindrical chamber provided with connected shaft bearings through opposite ends thereof positioned concentric with the chamber axis, a release shaft formed with a friction drum on the outer end thereof rotatably mounted in one end clutch housing bearing and a driven shaft section rotatably mounted in the opposite end clutch housing bearing, each of said shaft sections being provided with a tubular section rim operating lug projected from the inner adjacent ends within the clutch housing chamber and overlapping each other on opposite sides of the chamber diameter, a lock bar formed with circular ends rotatably mounted within the clutch housing chamber positioned between the respective shaft operating lugs capable of forcible sidewise displacement thereby transversely of the shaft axis for engaging or disengaging the lock bar with the inclosing clutch chamber walls as a restraining force is applied to the respective shaft sections.

5. A power release clutch adapted for releasing a connected driven shaft section from the power unit while in motion, comprising a power driven clutch housing formed with a cylindrical central chamber provided with connected shaft bearings through opposite ends thereof positioned concentric with the chamber axis, a release shaft provided with a friction drum on the outer end thereof rotatably mounted through one end clutch housing bearing, a driven shaft section rotatably mounted through the opposite end clutch housing bearing, each of said shaft sections being provided with a tubular section rim operating lug on the inner adjacent ends thereof, said lugs being positioned on opposite sides of the clutch chamber and overlapping each other, the driven shaft lug being smaller and nearest the shaft center, a lock bar formed with circular ends having the center nearer one edge thereof, rotatably mounted within the housing clutch chamber slightly off center and capable of slight sidewise displacement transversely of the shaft axis within the clutch chamber, said lock bar being positioned between the respective shaft operating lugs in a manner for locking with the clutch housing chamber walls when a restraining pressure is applied through the driven shaft section, likewise be displaced therefrom to a free rotating position whenever a restraining force is applied thereto through the connected release shaft section.

SKARDON T. SMITH.